United States Patent
Lee et al.

(10) Patent No.: US 9,319,196 B2
(45) Date of Patent: Apr. 19, 2016

(54) METHOD OF OPERATING AN HARQ BUFFER FOR A DYNAMIC SUB-FRAME CHANGE AND AN APPARATUS FOR SAME

(75) Inventors: Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 14/235,398

(22) PCT Filed: Aug. 20, 2012

(86) PCT No.: PCT/KR2012/006596
§ 371 (c)(1),
(2), (4) Date: Jan. 27, 2014

(87) PCT Pub. No.: WO2013/027985
PCT Pub. Date: Feb. 28, 2013

(65) Prior Publication Data
US 2014/0161090 A1     Jun. 12, 2014

Related U.S. Application Data

(60) Provisional application No. 61/526,674, filed on Aug. 23, 2011.

(51) Int. Cl.
*H04W 4/00* (2009.01)
*H04L 5/00* (2006.01)
(Continued)

(52) U.S. Cl.
CPC ............... *H04L 5/0053* (2013.01); *H04L 1/18* (2013.01); *H04L 1/1822* (2013.01); *H04L 1/1835* (2013.01); *H04L 1/1874* (2013.01); *H04L 1/0025* (2013.01); *H04L 1/0036* (2013.01)

(58) Field of Classification Search
None
See application file for complete search history.

(56) References Cited

U.S. PATENT DOCUMENTS

2009/0024896 A1   1/2009   Tseng
2011/0035639 A1   2/2011   Earnshaw et al.
(Continued)

FOREIGN PATENT DOCUMENTS

CN   101848490   9/2010
CN   102111798   6/2011
(Continued)

OTHER PUBLICATIONS

LG Electronics, "Issues in Further Enhancements to LTE TDD," 3GPP TSG RAN WG1 Meeting #68bis, R1-121461, Mar. 2012, 4 pages.
(Continued)

*Primary Examiner* — Jutai Kao
(74) *Attorney, Agent, or Firm* — Lee, Hong, Degerman, Kang & Waimey

(57) ABSTRACT

The present invention relates to a method of supporting a Hybrid Automatic Repeat and request (HARQ) scheme of a reception end for supporting a dynamic resource change in a wireless communication system. In particular, the method includes the steps of receiving a change message for changing a currently applied first subframe setting to a second subframe setting from a transmission end, and transmitting and receiving a signal to and from the transmission end according to the second subframe setting, wherein a plurality of subframe settings including the first and second subframe settings are divided into one or more groups, the first and second subframe settings belongs to an identical group, and the HARQ scheme is applied according to the group-specific maximum number of HARQ processes and a soft buffer size for each HARQ process when the subframe setting is changed according to the change message.

15 Claims, 12 Drawing Sheets

(51) Int. Cl.
*H04L 1/18* (2006.01)
*H04L 1/00* (2006.01)

(56) References Cited

U.S. PATENT DOCUMENTS

| | | | |
|---|---|---|---|
| 2011/0128896 A1 | 6/2011 | Huang et al. | |
| 2012/0275397 A1* | 11/2012 | Hsieh | H04L 1/1812 370/329 |
| 2013/0176981 A1* | 7/2013 | Earnshaw et al. | 370/329 |
| 2014/0010213 A1* | 1/2014 | Wang | H04B 7/0486 370/336 |
| 2014/0050107 A1* | 2/2014 | Charbit et al. | 370/252 |
| 2014/0160967 A1* | 6/2014 | Gao et al. | 370/252 |

FOREIGN PATENT DOCUMENTS

| | | |
|---|---|---|
| WO | 2009/151280 | 12/2009 |
| WO | 2010/095857 | 8/2010 |
| WO | 2012/063227 | 5/2012 |

OTHER PUBLICATIONS

Huawei, et al., "Soft buffer size allocation for Rel-10 downlink," 3GPP TSG RAN WG1 Meeting #63bis, R1-110008, Jan. 2011, 4 pages.

ZTE, "Consideration on Subframe Configuration Modification in Un Link," TSG-RAN WG1 #64, R1-110811, Feb. 2011, 2 pages.

ZTE, "36.216 CR 0006 (Rel-10, F) on Un TDD UL grant timing," 3GPP TSG-RAN WG1 Meeting #65, R1-111515, May 2011, 4 pages.

European Patent Office Application Serial No. 12826413.2, Search Report dated Mar. 4, 2015, 8 pages.

PCT International Application No. PCT/KR2012/006596, Written Opinion of the International Searching Authority dated Feb. 25, 2013, 23 pages.

The State Intellectual Property Office of the People's Republic of China Application Serial No. 201280040990.0, Office Action dated Feb. 16, 2016, 5 pages.

* cited by examiner

FIG. 2
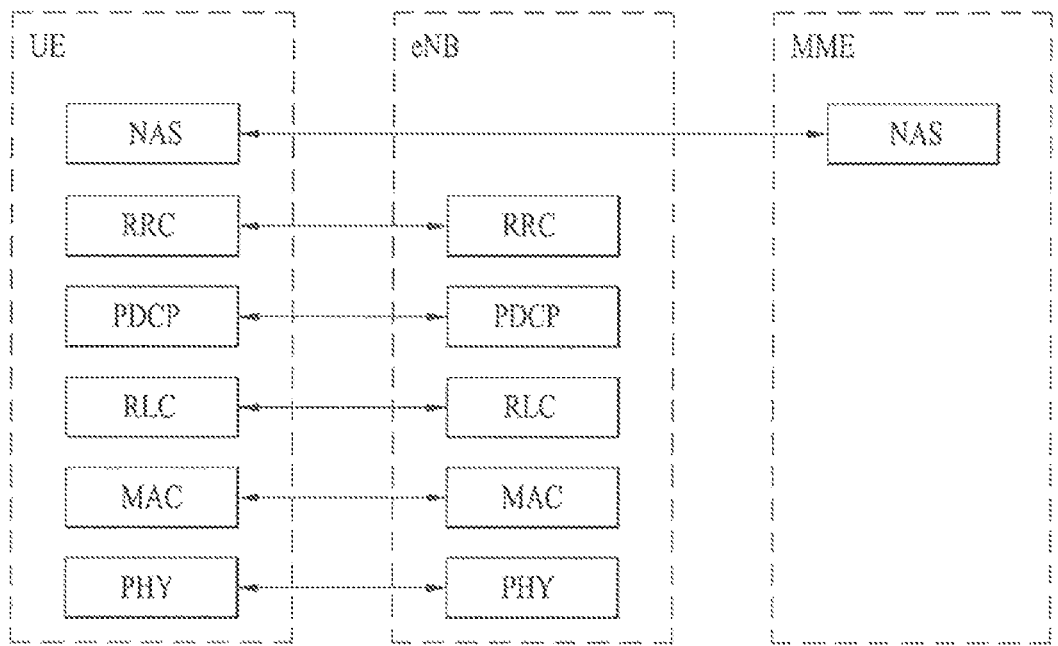
(a) Control-plane protocol stack
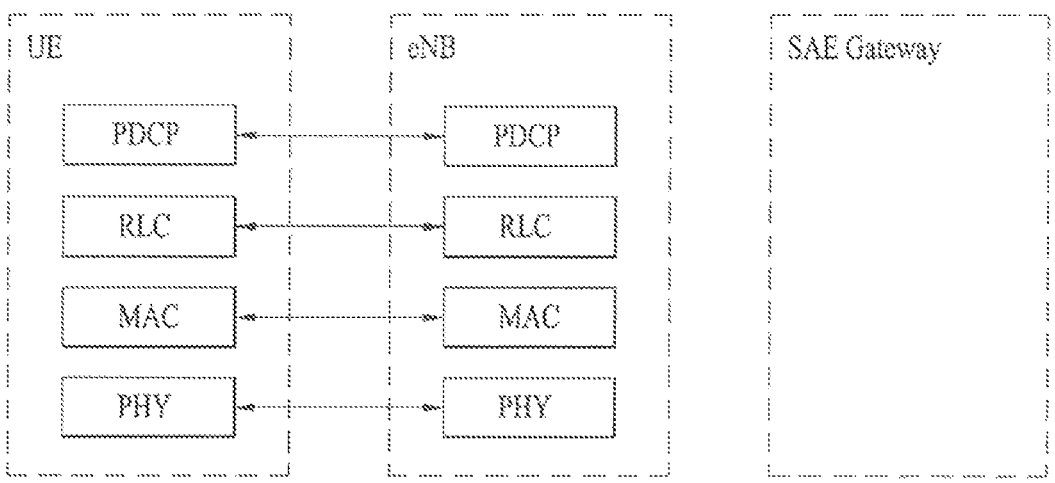
(b) User-plane protocol stack

METHOD OF OPERATING AN HARQ BUFFER FOR A DYNAMIC SUB-FRAME CHANGE AND AN APPARATUS FOR SAME

CROSS-REFERENCE TO RELATED APPLICATIONS

This application is the National Stage filing under 35 U.S.C. 371 of International Application No. PCT/KR2012/006596, filed on Aug. 20, 2012, which claims the benefit of U.S. Provisional Application Ser. No. 61/526,674, filed on Aug. 23, 2011, the contents of which are all hereby incorporated by reference herein in their entirety.

TECHNICAL FIELD

The present invention relates to a wireless communication system, and more particularly, to a method of operating a Hybrid Automatic Repeat and request (HARQ) buffer for a dynamic subframe change in a wireless communication system and an apparatus for the same.

BACKGROUND ART

A 3$^{rd}$ generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), a base station (eNode B; eNB), and an Access Gateway (AG) which is located at an end of a network (E-UTRAN) and connected to an external network. Generally, the base station may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on aforementioned discussion, an object of the present invention devised to solve the conventional problem is to provide a method of operating a Hybrid Automatic Repeat and request (HARQ) buffer for a dynamic subframe change in a wireless communication system and an apparatus for the same.

Technical Solution

In one aspect of the present invention, a method of supporting a Hybrid Automatic Repeat and request (HARQ) scheme of a reception end for supporting a dynamic resource change in a wireless communication system comprises the steps of receiving a change message for changing a currently applied first subframe configuration to a second subframe configuration from a transmission end; and transmitting and receiving a signal to and from the transmission end in accordance with the second subframe configuration, wherein a plurality of subframe configurations including the first and second subframe configurations are divided into one or more groups, the first and second subframe configurations belong to an identical group, and the HARQ scheme is applied in accordance with the group-specific maximum number of HARQ processes and a soft buffer size for each HARQ process when the subframe configuration is changed in accordance with the change message.

Preferably, the second subframe configuration-specific maximum number of HARQ processes and the soft buffer size for each HARQ process are disregarded if the subframe configuration is changed in accordance with the change message.

Also, the soft buffer size for each HARQ process may be a value obtained by dividing the total soft buffer size by the maximum number of HARQ processes, or may be maintained at a constant size regardless of the maximum number of HARQ processes.

Moreover, the method may further comprise the step of receiving information on the group-specific maximum number of HARQ processes and the soft buffer size for each HARQ process from the transmission end.

Preferably, the change message is received through either radio resource control (RRC) layer signaling or physical layer signaling.

In another aspect of the present invention, a method of supporting a Hybrid Automatic Repeat and request (HARQ) scheme of a transmission end for supporting a dynamic resource change in a wireless communication system comprises the steps of transmitting a change message for changing a currently applied first subframe configuration to a second subframe configuration to a reception end; and transmitting and receiving a signal to and from the reception end in accordance with the second subframe configuration, wherein a plurality of subframe configurations including the first and second subframe configurations are divided into one or more groups, the first and second subframe configurations belong to an identical group, and the HARQ scheme is applied in accordance with the group-specific maximum number of HARQ processes and a soft buffer size for each HARQ process when the subframe configuration is changed in accordance with the change message.

Preferably, the second subframe configuration-specific maximum number of HARQ processes and the soft buffer size for each HARQ process are disregarded if the subframe configuration is changed in accordance with the change message.

Advantageous Effects

According to the embodiment of the present invention, the user equipment and the base station may efficiently perform HARQ buffer operation while supporting a dynamic subframe change in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a user equipment and an E-UTRAN based on the 3GPP radio access network standard;

BEST MODE FOR CARRYING OUT THE INVENTION

Figure 1:
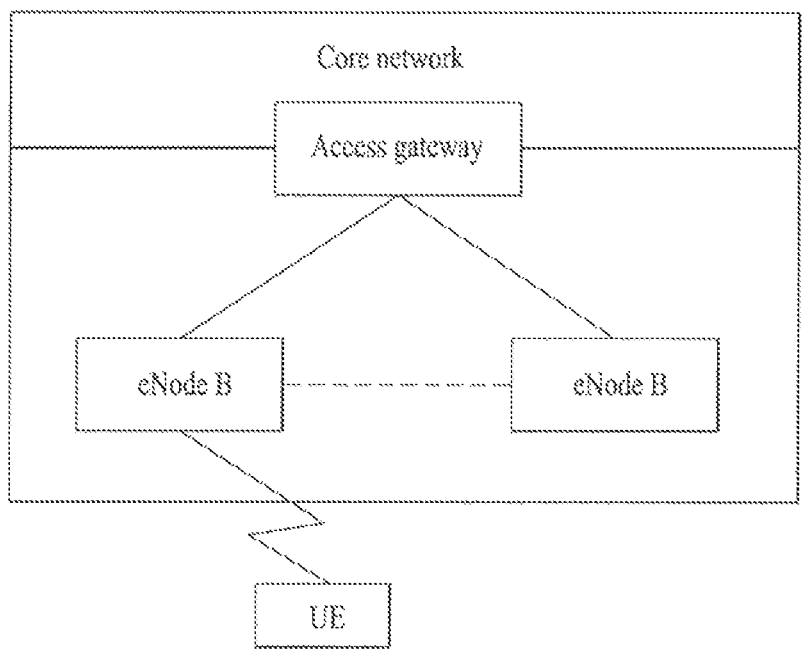
FIG. 1 is a diagram illustrating a network structure of an Evolved Universal Mobile Telecommunications System (E-UMTS), which is an example of a wireless communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer via a transport channel, wherein the medium access control layer is located above the physical layer. Data are transferred between the medium access control layer and the physical layer via the transport channel. Data are transferred between one physical layer of a transmission end and the other physical layer of a reception end via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to efficiently transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
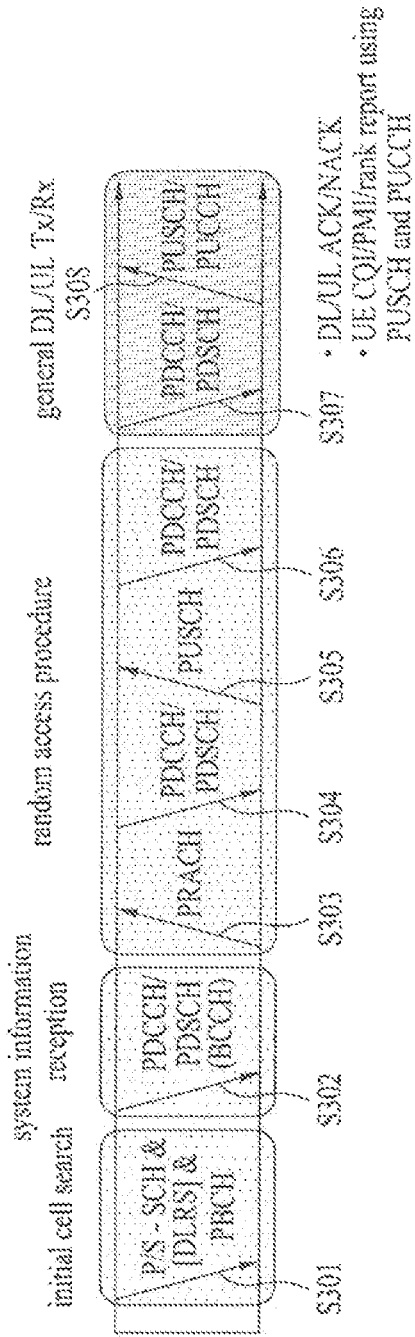
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
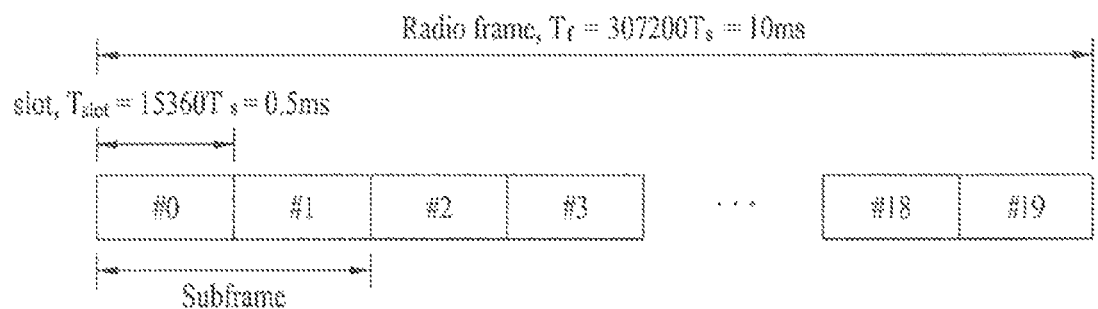
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols in a time domain, and includes a plurality of resource blocks (RBs) in a frequency domain. In the LTE system, one resource block includes twelve (12) subcarriers× seven (or six) OFDM symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 5:
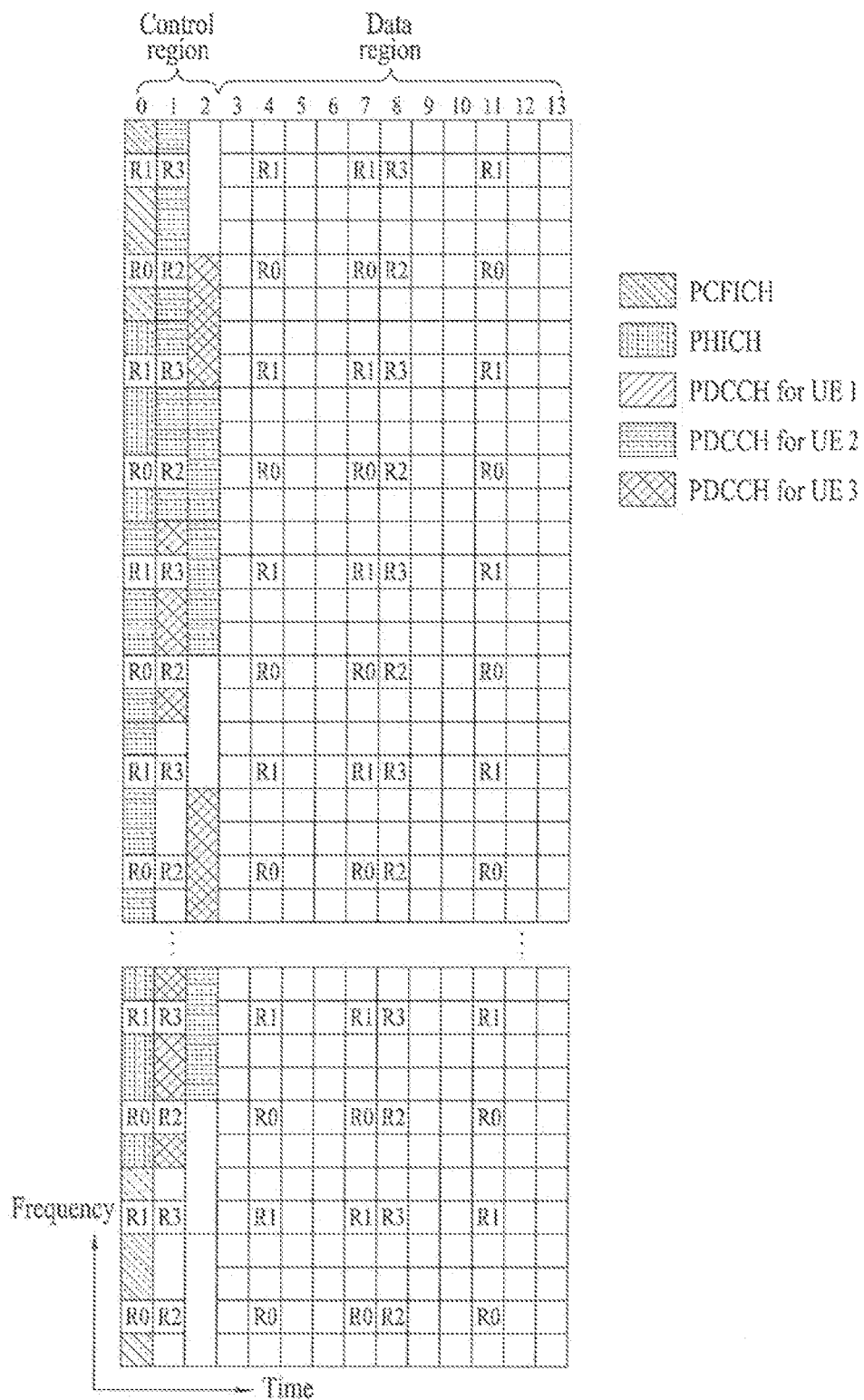
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

Figure 6:
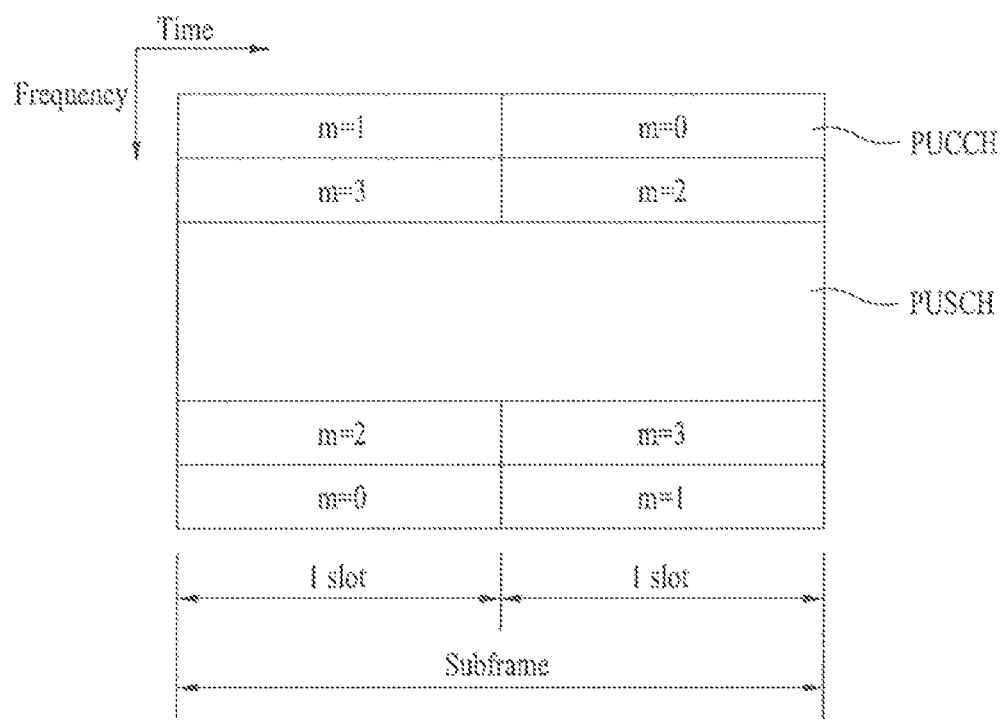
FIG. 6 is a diagram illustrating a structure of an uplink subframe used in an LTE system.

FIG. 6 is a diagram illustrating a structure of an uplink subframe used in an LTE system.

Referring to FIG. 6, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that reserves different frequencies in each slot within the subframe. Namely, two resource blocks allocated to the PUCCH undergo frequency hopping in the boundary of the slots. Particularly, FIG. 6 exemplarily illustrates that PUCCH of m=0, PUCCH of m=1, PUCCH of m=2, and PUCCH of m=3 are allocated to the subframe.

The present invention suggests efficient HARQ operation if eNB dynamically changes a specific radio resource (for example, downlink resource or uplink resource), which is allocated to the user equipment UE, for downlink or uplink in accordance with change of traffic load.

First of all, before the detailed description of the suggestion is made, uplink-downlink configuration defined in a 3GPP LTE system based TDD system will be described.

TABLE 1

| Uplink-downlink configuration | Downlink-to-Uplink Switch-point periodicity | \multicolumn{10}{c}{Subframe number} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D, U and S allocated to each of subframe numbers represent a downlink subframe, an uplink subframe and a special subframe, respectively. Also, the following Table 2 illustrates uplink subframe numbers (indexes) for transmitting uplink ACK/NACK for a corresponding downlink signal from UE in a 3GPP LTE system based TDD system.

TABLE 2

| UL-DL Configuration | \multicolumn{10}{c}{subframe number} | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

In particular, in Table 2, '-' represents that the uplink subframe has been set, and a number allocated to each of subframe numbers represents an uplink subframe index, that is, an uplink subframe index linked to the corresponding downlink subframe.

Table 2 may be expressed by the following Table 3. The following Table 3 illustrates a subframe n for which uplink ACK/NACK is transmitted. In other words, ACK/NACK for a downlink signal received for a subframe n−K is fed back for the subframe n, and the following Table 3 illustrates a value of the K.

TABLE 3

| UL-DL Configuration | \multicolumn{10}{c}{Subframe n} |
|---|---|---|---|---|---|---|---|---|---|---|
|  | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Hereinafter, an HARQ scheme in the LTE system will be described.

Figure 7:
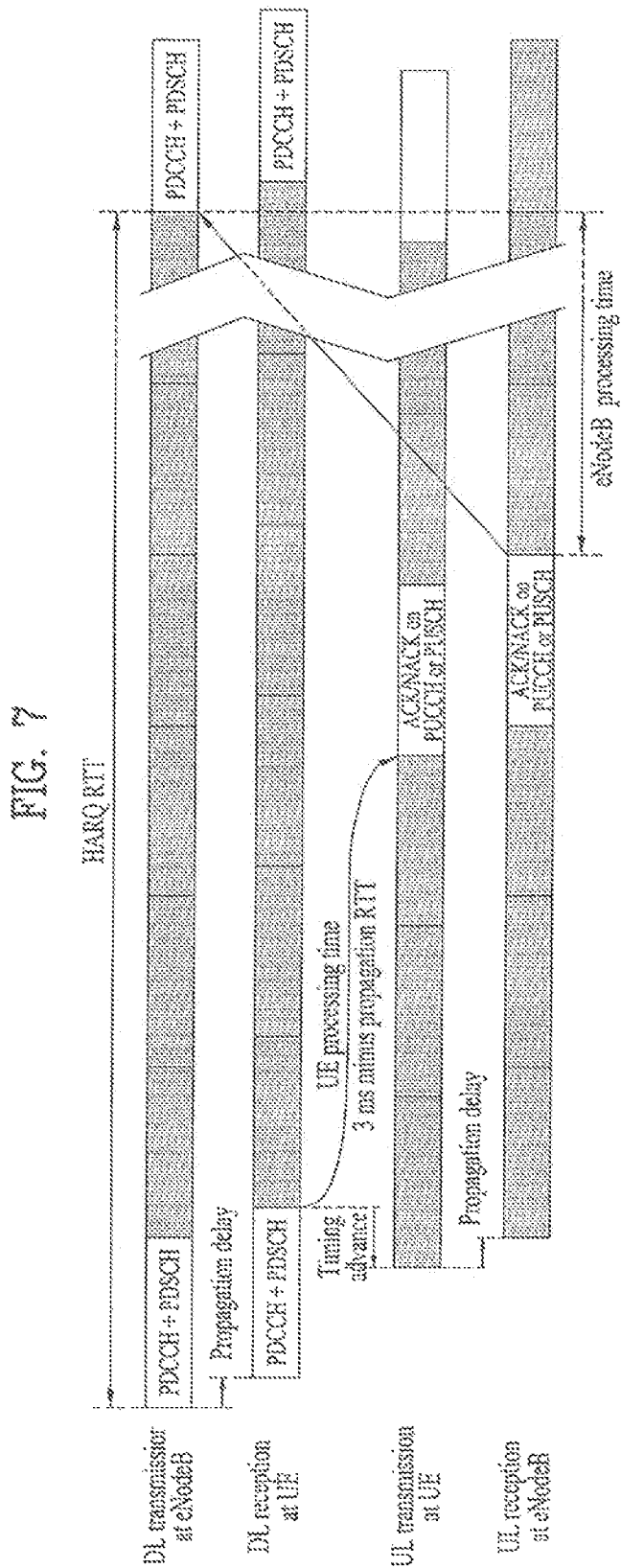
FIG. 7 is a diagram illustrating a downlink HARQ process in an LTE FDD system.
Figure 8:
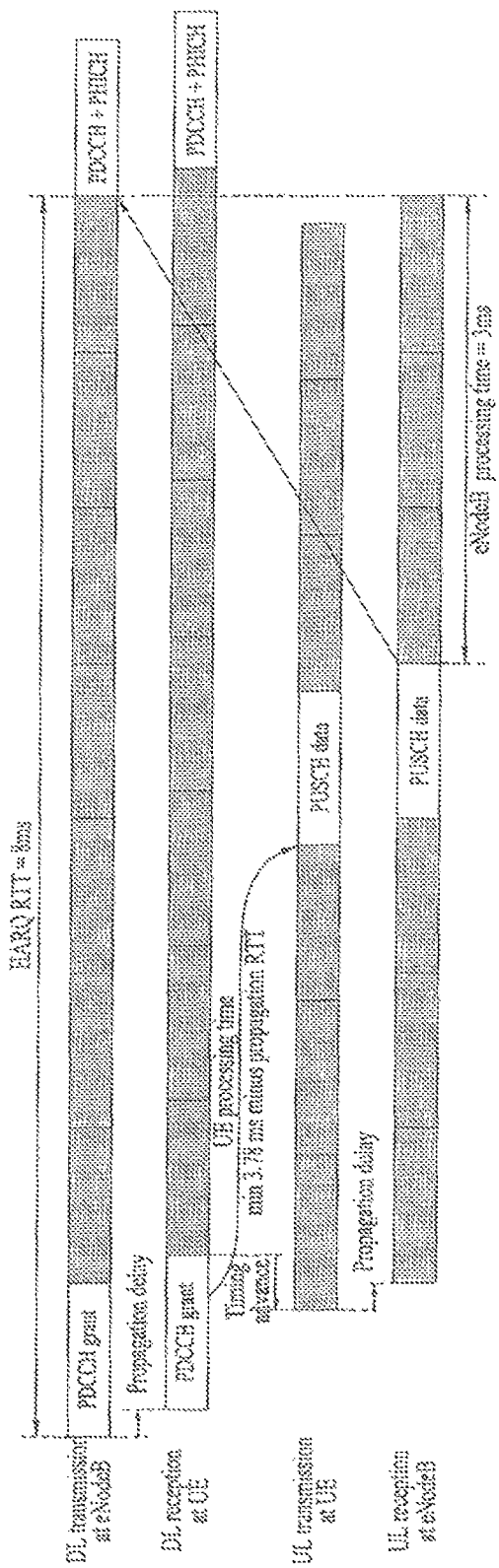
FIG. 8 is a diagram illustrating an uplink HARQ process in an LTE FDD system.

In the LTE FDD system, eight Stop-And-Wait (SAW) HARQ processes are supported on both the uplink and the downlink in accordance with a constant round-trip time (RTT) of 8 ms. FIG. 7 is a diagram illustrating a downlink HARQ process in an LTE FDD system, and FIG. 8 is a diagram illustrating an uplink HARQ process in an LTE FDD system.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process). Also, in the LTE system, it is defined that information such as a new data indicator (NDI), a redundancy version (RV) and a modulation and coding scheme (MCS) level is signaled to the reception end.

In the meantime, the downlink HARQ process of the LTE system is an adaptive asynchronous scheme. Accordingly, downlink control information for the HARQ process is explicitly accompanied per downlink transmission. On the other hand, the uplink HARQ process of the LTE system is a synchronous scheme, and may be performed adaptively or non-adaptively. Since the uplink non-adaptive HARQ scheme does not accompany signaling of explicit control information, sequence such as previously set RV sequence, that is, 0, 2, 3, 1, 0, 2, 3, 1, . . . is required for continuous packet transmission. However, according to the uplink adaptive HARQ scheme, RV is signaled explicitly.

The present invention suggests a method for operating a buffer to support efficient DL HARQ operation of UE when the eNB dynamically changes usage of a specific radio resource (for example, DL resource or UL resource) conventionally allocated to the UE for the purpose of UL resource or DL resource in accordance with change of traffic load. First of all, before the detailed description of the suggestion is made, the maximum number of TDD type DL HARQ processes defined in the 3GPP LTE system based TDD system is as illustrated in Table 4 below.

TABLE 4

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

In the meantime, as examples of a method for enabling an eNB to dynamically change usage of a specific radio resource conventionally allocated to UE, 1) a method for notifying usage change of a specific radio resource by signaling additional UL/DL configuration through dedicated RRC signaling (that is, RRC reconfiguration message) and 2) a method for notifying usage of a specific radio resource by using a specific field of a physical control channel, for example, a carrier indication field (CIF), a downlink assignment index (DAI), or UL index may be considered.

The present invention may be applied to all the cases to which methods for enabling eNB to dynamically change usage of a specific radio resource (for example, DL resource or UL resource) conventionally allocated from the eNB to the user equipment UE for the purpose of UL resource or DL resource are applied, as well as a case where usage of a specific radio resource is changed in accordance with the method of 1) or the method of 2). Also, the present invention may be applied to the case to which methods for enabling eNB to dynamically change usage of a radio resource conventionally allocated to the user equipment UE for each component carrier, wherein a plurality of component carriers are allocated to the user equipment UE in the same manner as a carrier aggregation scheme.

Figure 9:
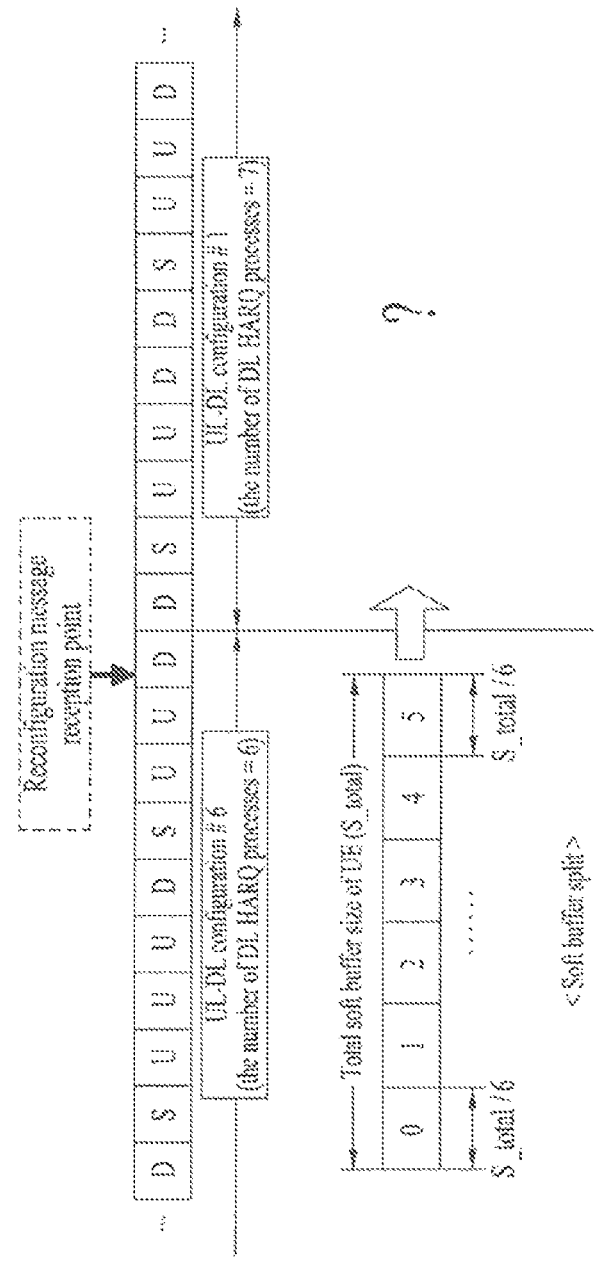
FIG. 9 is a diagram illustrating an example of a method for notifying usage change of a specific radio resource through dedicated RRC signaling in a TDD system.

FIG. 9 is a diagram illustrating an example of a method for notifying usage change of a specific radio resource through dedicated RRC signaling in a TDD system. In other words, FIG. 9 corresponds to a case where resource usage is changed dynamically by the method of 1), and it is assumed that subframe configuration is changed from the existing UL-DL configuration #6 to UL-DL configuration #1 due to increase of DL traffic request.

Referring to FIG. 9, it is assumed that a soft buffer size for each DL HARQ process of the user equipment UE is a value obtained by dividing a total soft buffer size (that is, S_total) of the user equipment UE by the maximum number (that is, N) of the DL HARQ processes. Accordingly, it is noted that the soft buffer size for each DL HARQ process of the user equipment UE under the existing UL-DL configuration #6 is "S_total/6". In this case, the maximum number of the DL HARQ processes of UL-DL configuration #6 is 6 as illustrated in Table 4 (that is, N=6).

In the meantime, if the eNB reconfigures the existing UL-DL configuration #6 to new UL-DL configuration #1, a soft buffer split rule of the user equipment UE for supporting efficient DL HARQ operation of UL-DL configuration #1 of which maximum number of DL HARQ processes is 7 will be required.

<First Embodiment>

The first embodiment of the present invention suggests a fixed soft buffer split scheme under the status of FIG. 9.

In more detail, even though new UL-DL configuration is reconfigured, a soft buffer split method for DL HARQ processes and the maximum number of DL HARQ processes is operated on the basis of UL-DL configuration of system information block (SIB) information which is previously received. In other words, even in the case that new UL-DL configuration of which number of DL subframes is more than the number of DL subframes of the existing UL-DL configuration, the maximum number of DL HARQ processes and the soft buffer size for each DL HARQ process are maintained equally to the case based on the SIB information. In this case, although a problem may occur in that a lack of a soft buffer may be caused, this problem may be solved by application of a common soft buffer.

Also, considering an impact on a legacy user equipment UE, which occurs if new UL-DL configuration is reconfigured, it is general that new UL-DL configuration having DL subframes more than those of the existing SIB based UL-DL configuration is reconfigured. Accordingly, the maximum number of DL HARQ processes (that is, K_MAX_SIB) of the existing SIB based UL-DL configuration may mean a lower limit value of the maximum number of DL HARQ processes that may be maintained during dynamic resource change. When considering the aforementioned points, it is preferable to split the total soft buffer size (that is, S_total) into K_MAX_SIB to configure a soft buffer size for each DL HARQ process of the user equipment UE while maintaining the maximum number of HARQ processes for DL HARQ operation to reach K_MAX_SIB.

Additionally, if the eNB reconfigures new UL-DL configuration for the user equipment UE, which has DL subframes more than those of the existing SIB based UL-DL configuration, although maximum throughput of the user equipment UE according to the present invention is not increased, a plurality of UEs may be scheduled in accordance with a time division multiplexing (TDM) scheme by using DL subframes more than those of the existing UL-DL configuration, whereby cell throughput may be improved.

Figure 10:
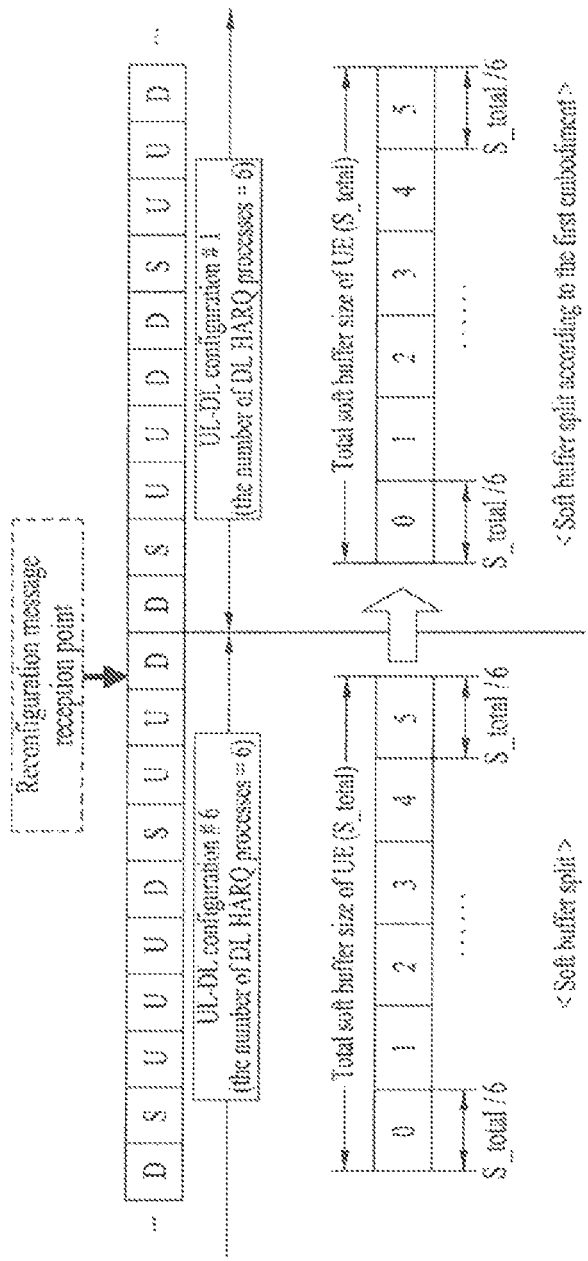
FIG. 10 is a diagram illustrating an application example of soft buffer split in accordance with the first embodiment of the present invention.

FIG. 10 is a diagram illustrating an application example of soft buffer split in accordance with the first embodiment of the present invention. In particular, in FIG. 10, it is assumed that subframe configuration is changed from the existing UL-DL configuration #6 to UL-DL configuration #1 in the same manner as FIG. 9.

Referring to FIG. 10, the maximum number of DL HARQ processes of (SIB based) UL-DL configuration #6 and (re-configured) UL-DL configuration #1 and soft buffer size for each DL HARQ process are equally maintained at 6 and S_total/6, respectively. Also, the total soft buffer size (that is, S_total) of the user equipment UE is equal in case of UL-DL configuration #6 and UL-DL configuration #1.

The first embodiment of the present invention may be applied to even the case that new UL-DL configuration is reconfigured additionally after new UL-DL configuration is reconfigured for the UE by the eNB.

<Second Embodiment>

The second embodiment of the present invention suggests a dynamic soft buffer split scheme under the status of FIG. 9.

In more detail, when new UL-DL configuration is reconfigured, a soft buffer split method for DL HARQ processes and the maximum number of DL HARQ processes is operated on the basis of UL-DL configuration which is previously received. In other words, if the user equipment UE is allocated, from the eNB, with new UL-DL configuration of which number of DL subframes is more than the number of DL subframes of the existing SIB based UL-DL configuration (that is, the maximum number of DL HARQ processes=K_MAX_SIB, soft buffer size for each DL HARQ process=S_total/K_MAX_SIB) and the maximum number of HARQ processes is K_MAX_RECONFIG, the maximum number of DL HARQ processes the soft buffer size for each DL HARQ process after new UL_DL configuration is applied are changed to K_MAX_RECONFI and S_total/K_MAX_RECONFIG, respectively.

Additionally, if the eNB reconfigures new UL-DL configuration having DL subframes more than those of the existing SIB based UL-DL configuration, for the UE, the soft buffer split scheme according to the second embodiment of the present invention may improve cell throughput as well as maximum throughput of the UE according to the present invention on the basis of the increased number of DL subframes and the increased maximum number of DL HARQ processes.

Also, the amount of DL traffic may relatively be more reduced than the request amount of UL traffic during operation based on newly allocated UL-DL configuration, whereby new UL-DL configuration having DL subframes less than those of the current UL-DL configuration may be reconfigured for the user equipment UE. In this case, when the eNB selects new UL-DL configuration having DL subframes less than those of the current UL-DL configuration, UL-DL configuration having the minimum number of DL subframes that may be selected considering an impact on the legacy user equipment UE becomes the SIB based UL-DL configuration. Under the circumstances, the maximum number of DL HARQ processes may be reduced, whereby an operation rule as to which region of soft buffer regions reserved by the existing DL HARQ processes will be shared by the other DL HARQ processes is required.

In this case, among the existing DL HARQ processes, regions of soft buffers reserved by DL HARQ processes having the greater DL HARQ process numbers may sequentially be shared equally by the other DL HARQ processes. On the contrary, among the existing DL HARQ processes, regions of soft buffers reserved by DL HARQ processes having the smaller DL HARQ process numbers may sequentially be shared equally by the other DL HARQ processes.

Figure 11:
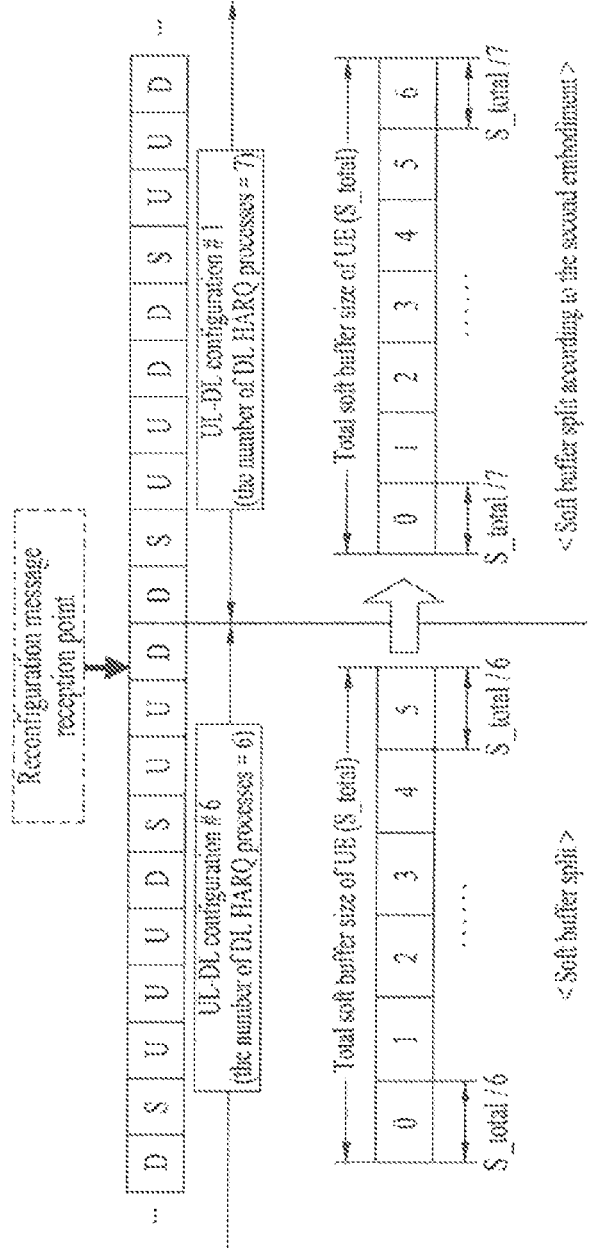
FIG. 11 is a diagram illustrating an application example of soft buffer split in accordance with the second embodiment of the present invention.

FIG. 11 is a diagram illustrating an application example of soft buffer split in accordance with the second embodiment of the present invention. In particular, in FIG. 11, it is assumed that subframe configuration is changed from the existing UL-DL configuration #6 to UL-DL configuration #1 in the same manner as FIGS. 9 and 10.

Referring to FIG. 11, after newly allocated UL-DL configuration #1 is applied, the maximum number of DL HARQ processes and a soft buffer size for each DL HARQ process are changed to 7 and S_total/7, respectively. In this case, the total soft buffer size (that is, S_total) of the user equipment UE is equal in case of UL-DL configuration #6 and UL-DL configuration #1.

The second embodiment of the present invention may be applied to even the case that new UL-DL configuration is reconfigured additionally after new UL-DL configuration is reconfigured for the UE by the eNB.

<Third Embodiment>

When new UL-DL configuration is reconfigured additionally, the maximum number of DL HARQ processes which are actually operated follow UL-DL configuration of SIB information which is previously received, and a soft buffer split method for DL HARQ processes may consider using the maximum number of DL HARQ processes of UL-DL configuration which is newly received.

When considering the impact on the legacy user equipment UE, it is general that the number of DL subframes of UL-DL configuration which is newly received and the maximum number of DL HARQ processes are more than those of SIB information based UL-DL configuration. Accordingly, if a soft buffer size for each DL HARQ process is configured using the maximum number of DL HARQ processes of the UL-DL configuration which is newly received, the soft buffer size for each DL HARQ process is relatively more reduced than that of the SIB information based UL-DL configuration.

However, the maximum number of DL HARQ processes which are actually operated follows the SIB based UL-DL configuration, and the region reserved by DL HARQ processes, which is not used among the soft buffer regions split into the maximum number of DL HARQ processes of the UL-DL configuration which is newly received, may be shared by the other DL HARQ processes, whereby efficient DL HARQ operation may be supported.

In this case, as a method for sharing regions reserved by DL HARQ processes, which are not used among soft buffer regions divided into the maximum number of DL HARQ processes of UL-DL configuration which is newly received, through the other DL HARQ processes, the regions may be allocated in the form of round-robin in the order of DL HARQ process having the smallest DL HARQ process number of the SIB based DL HARQ processes, which currently perform valid DL HARQ operation, in an ascending order.

For example, if the maximum number of DL HARQ processes of SIB information based UL-DL configuration and the maximum number of DL HARQ processes of newly received UL-DL configuration are 4 and 6, respectively, soft buffer regions reserved by DL HARQ process #4 and DL HARQ process #5, which are not used, are respectively allocated to DL HARQ process #0 and DL HARQ process #1, which currently perform valid DL HARQ operation.

Alternatively, the soft buffer regions may be allocated in the form of round-robin in the order of DL HARQ process having the greatest DL HARQ process number of the SIB based DL HARQ processes, which currently perform valid DL HARQ operation, in a descending order.

Additionally, regions reserved by DL HARQ processes, which are not used, among soft buffer regions divided into the maximum number of DL HARQ processes of newly received UL-DL configuration may totally be allocated to the DL HARQ process having a specific DL HARQ process number previously defined between the eNB and the user equipment UE (through upper layer signaling or a specific field of the physical channel).

The third embodiment of the present invention may be applied to even the case that new UL-DL configuration is reconfigured additionally after new UL-DL configuration is reconfigured for the UE by the eNB.

<Fourth Embodiment>

When new UL-DL configuration is reconfigured additionally, the maximum number of DL HARQ processes which are actually operated follow UL-DL configuration which is newly received, and a soft buffer split method for DL HARQ processes may consider using UL-DL configuration (that is, K_MAX_SIB) of SIB information which is previously received.

According to this method, the number of soft buffer regions which are split (for DL HARQ processes) is smaller than the maximum number of DL HARQ processes which are actually operated, and a sharing rule for the soft buffer region between the DL HARQ processes which are actually operated will be required.

As an example of the sharing rule, the corresponding soft buffer region may be shared in the form of round-robin in the order of DL HARQ process having the smallest DL HARQ process number of the DL HARQ processes in an ascending order. For example, if the maximum number of DL HARQ processes of SIB information based UL-DL configuration and the maximum number of DL HARQ processes of newly received UL-DL configuration are 4 and 6, respectively, DL HARQ process #5 and DL HARQ process #4 of UL-DL configuration, which is newly received, share the soft buffer with DL HARQ process #0 and DL HARQ process #1, respectively. On the other hand, the corresponding soft buffer region may be shared in the form of round-robin in the order of DL HARQ process having the greatest DL HARQ process number of the DL HARQ processes in a descending order.

Additionally, the corresponding soft buffer region of the DL HARQ process having a specific DL HARQ process number previously defined between the eNB and the user equipment UE (through upper layer signaling or a specific field of the physical channel) may be shared.

The fourth embodiment of the present invention may be applied to even the case that new UL-DL configuration is reconfigured additionally after new UL-DL configuration is reconfigured for the UE by the eNB.

<Fifth Embodiment>

In the meantime, when the eNB reconfigures new UL-DL configuration for the user equipment UE, the eNB may additionally notify the user equipment UE of the maximum number of DL HARQ processes of a specific value together with new UL-DL configuration (or independently through upper layer signaling or a specific field of the physical channel), whereby the user equipment UE may configure a soft buffer size for each DL HARQ process and the maximum number of DL HARQ processes which are actually operated after application of new UL-DL configuration on the basis of the maximum DL HARQ processes of the received specific value.

In this case, the maximum number of DL HARQ processes of the specific value which is additionally notified from the eNB to the user equipment UE does not mean the maximum number of DL HARQ processes of new UL-DL configuration, and may be greater than or smaller than the maximum number of DL HARQ processes of new UL-DL configuration.

Alternatively, the maximum number of DL HARQ processes of the specific value which is additionally notified from the eNB to the user equipment UE may be notified as a relative offset value for the maximum number of DL HARQ processes corresponding to SIB information based UL-DL configuration.

The fifth embodiment of the present invention may be applied to even the case that new UL-DL configuration is reconfigured additionally after new UL-DL configuration is reconfigured for the UE by the eNB.

<Sixth Embodiment>

Also, if the eNB reconfigures new UL-DL configuration for the user equipment UE, the eNB may designate the maximum number of DL HARQ processes of a specific value (through upper layer signaling or a specific field of the physical channel), which is used when new UL-DL configuration not the SIB information based UL-DL configuration is applied between the eNB and the user equipment UE.

Accordingly, if new UL-DL configuration not the SIB information based UL-DL configuration is applied between the eNB and the user equipment UE, the maximum number of DL HARQ processes and a soft buffer size for each DL HARQ process are maintained equally. In this case, the maximum number of DL HARQ processes of the specific value may be greater than or equal to the maximum number of DL HARQ processes corresponding to SIB information based UL-DL configuration. Alternatively, the maximum number of DL HARQ processes of the specific value may be notified from the eNB to the user equipment UE as a relative offset value for the maximum number of DL HARQ processes corresponding to SIB information based UL-DL configuration.

<Seventh Embodiment>

Finally, if the eNB reconfigures new UL-DL configuration for the user equipment UE, a dynamic subframe configuration set of which dynamic change may be performed previously may previously be designated and then may be limited to candidates of a set to which the SIB information based UL-DL configuration belongs. For example, in the aforementioned Table 1, UL-DL configurations #3, #4 and #5 may be limited to set 1, and UL-DL configurations #0, #1, #2, and #6 may be limited to set 2. In this case, if the SIB information based UL-DL corresponds to UL-DL configuration #3, UL-DL configuration which is reconfigured may be selected as one UL-DL configurations #4 and #5 of the set 1.

Under the circumstances, the maximum number of DL HARQ processes per dynamic subframe configuration set may previously be defined as a specific value. In this case, the maximum number of DL HARQ processes per dynamic subframe configuration set may be notified from the eNB to the user equipment UE through upper layer signaling or a specific field of the physical channel. For example, the set 1 of UL-DL configurations #3, #4 and #5 may be configured such that the maximum number of DL HARQ processes is 9, and the set 2 of UL-DL configurations #0, #1, #2 and #6 may be configured such that the maximum number of DL HARQ processes is 4. In other words, all the UL-DL configurations corresponding to the same dynamic subframe configuration set maintain the maximum number of DL HARQ processes and the soft buffer size for each DL HARQ process at the same value.

The first embodiments to the seventh embodiments of the present invention may be applied for efficient UL HARQ operation of the user equipment UE if usage of a specific radio resource (for example, DL resource or UL resource) conventionally allocated from the eNB to the user equipment UE is changed dynamically for the purpose of UL resource or DL resource in accordance with change of traffic load.

Figure 12:
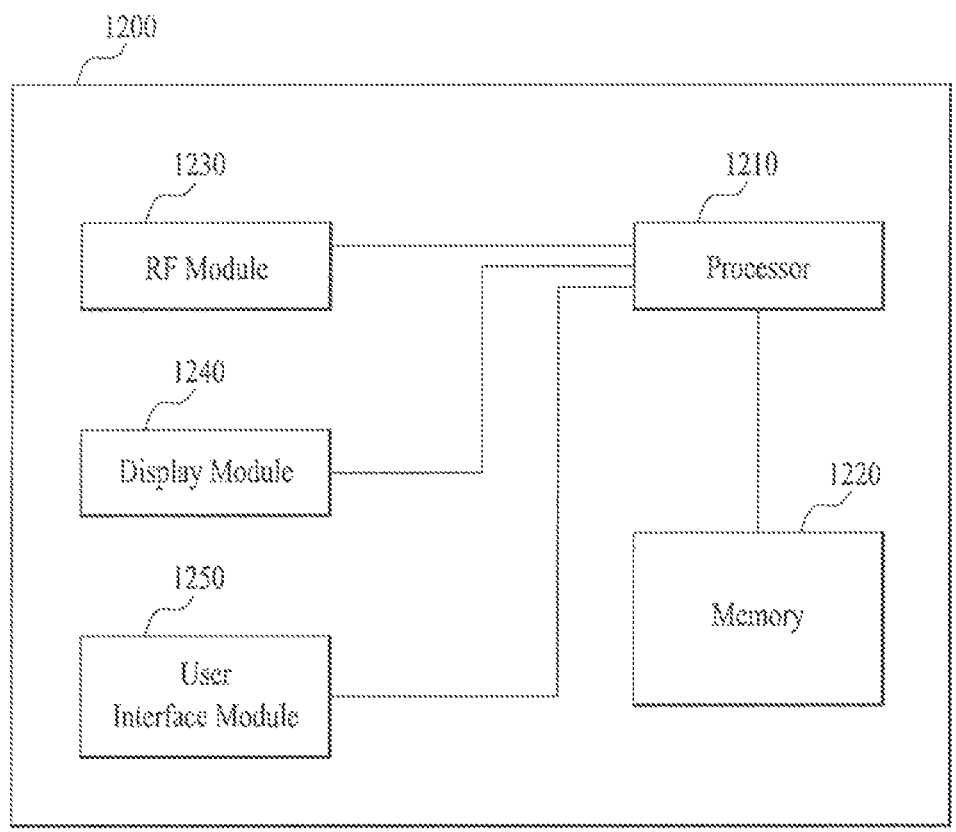
FIG. 12 is a block diagram illustrating a communication apparatus according to the embodiment of the present invention.

FIG. 12 is a block diagram illustrating a communication apparatus according to the embodiment of the present invention.

Referring to FIG. 12, the communication apparatus 1200 includes a processor 1210, a memory 1220, a radio frequency (RF) module 1230, a display module 1240, and a user interface module 1250.

The communication apparatus 1200 is illustrated for convenience of description, and some of its modules may be omitted. Also, the communication apparatus 1200 may further include necessary modules. Moreover, some modules of the communication apparatus 1200 may be divided into segmented modules. The processor 1210 is configured to perform the operation according to the embodiment of the present invention illustrated with reference to the drawings. In more detail, a detailed operation of the processor 1210 will be understood with reference to the disclosure described with reference to FIG. 1 to FIG. 11.

The memory 1220 is connected with the processor 1210 and stores an operating system, an application, a program code, and data therein. The RF module 1230 is connected with the processor 1210 and converts a baseband signal to a radio signal or vice versa. To this end, the RF module 1230 performs analog conversion, amplification, filtering and frequency uplink conversion, or their reverse processes. The display module 1240 is connected with the processor 1210 and displays various kinds of information. Examples of the display module 1240 include, but not limited to, a liquid crystal display (LCD), a light emitting diode (LED), and an organic light emitting diode (OLED). The user interface module 1250 is connected with the processor 1210, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Although the aforementioned method of operating a Hybrid Automatic Repeat and request (HARQ) buffer for a dynamic subframe change in a wireless communication system and the apparatus for the same have been described based on the 3GPP LTE system, they may be applied to various wireless communication systems in addition to the 3GPP LTE system.

The invention claimed is:

1. A method of applying a Hybrid Automatic Repeat and request (HARQ) scheme at a reception end supporting a dynamic resource change in a wireless communication system, the method comprising:
configuring two or more groups from a plurality of Time Division Duplex (TDD) Uplink/Downlink (UL/DL) subframe configurations, wherein each of the plurality of TDD UL/DL subframe configurations has a corresponding maximum number of HARQ processes;

receiving control information for changing a currently applied first TDD UL/DL subframe configuration to a second TDD UL/DL subframe configuration from a transmission end, wherein the first and second subframe configurations belong to a same group; and applying the HARQ scheme in accordance with a group-specific maximum number of HARQ processes regardless of a maximum number of HARQ processes corresponding to the second TDD UL/DL subframe configuration.

2. The method according to claim 1, wherein a soft buffer size for each HARQ process is maintained at a constant size regardless of the maximum number of HARQ processes corresponding to the second TDD UL/DL subframe configuration.

3. The method according to claim 1, further comprising:
receiving information on the group-specific maximum number of HARQ processes from the transmission end.

4. The method according to claim 1, wherein the control information is received through either radio resource control (RRC) layer signaling or physical layer signaling.

5. The method according to claim 1, wherein the maximum number of HARQ processes corresponding to the second TDD UL/DL subframe configuration and a soft buffer size for each HARQ process are disregarded if the subframe configuration is changed in accordance with the control information.

6. A method of applying a Hybrid Automatic Repeat and request (HARQ) scheme at a transmission end supporting a dynamic resource change in a wireless communication system, the method comprising:

configuring two or more groups from a plurality of Time Division Duplex (TDD) Uplink/Downlink (UL/DL) subframe configurations, wherein each of the plurality of TDD UL/DL subframe configurations has a corresponding maximum number of HARQ processes;

transmitting control information for changing a currently applied first TDD UL/DL subframe configuration to a second TDD UL/DL subframe configuration to a reception end, wherein the first and second subframe configurations belong to a same group; and applying the HARQ scheme in accordance with a group-specific maximum number of HARQ processes regardless of a maximum number of HARQ processes corresponding to the second TDD UL/DL subframe configuration.

7. The method according to claim 6, wherein a soft buffer size for each HARQ process is maintained at a constant size regardless of the maximum number of HARQ processes corresponding to the second TDD UL/DL subframe configuration.

8. The method according to claim 6, further comprising:
transmitting information on the group-specific maximum number of HARQ processes to the reception end.

9. The method according to claim 6, wherein the control information is transmitted through either radio resource control (RRC) layer signaling or physical layer signaling.

10. The method according to claim 6, wherein the maximum number of HARQ processes corresponding to the second TDD UL/DL subframe configuration and a soft buffer size for each HARQ process are disregarded if the subframe configuration is changed in accordance with the control information.

11. A user equipment (UE) configured to support a Hybrid Automatic Repeat and request (HARQ) scheme for applying a dynamic resource change in a wireless communication system, the device comprising:

a radio frequency (RF) module configured to transmit and receive signals to and from a base station (BS); and a processor configured to process the signals and configured to:

configure two or more groups from a plurality of Time Division Duplex (TDD) Uplink/Downlink (UL/DL) subframe configurations, wherein each of the plurality of TDD UL/DL subframe configurations has a corresponding maximum number of HARQ processes;

control the RF module to receive control information for changing a currently applied first TDD UL/DL subframe configuration to a second TDD UL/DL subframe configuration from a transmission end, wherein the first and second subframe configurations belong to a same group; and apply the HARQ scheme in accordance with a group-specific maximum number of HARQ processes regardless of a maximum number of HARQ processes corresponding to the second TDD UL/DL subframe configuration.

12. The UE according to claim 11, wherein a soft buffer size for each HARQ process is maintained at a constant size regardless of the maximum number of HARQ processes corresponding to the second TDD UL/DL subframe configuration.

13. The UE according to claim 11, wherein the processor is configured to control the receiver to receive information on the group-specific maximum number of HARQ processes from the transmission end.

14. The UE according to claim 11, wherein the control information is received through either radio resource control (RRC) layer signaling or physical layer signaling.

15. The UE according to claim 11, wherein the maximum number of HARQ processes corresponding to the second TDD UL/DL subframe configuration and a soft buffer size for each HARQ process are disregarded if the subframe configuration is changed in accordance with the control information.

* * * * *